Jan. 18, 1927.

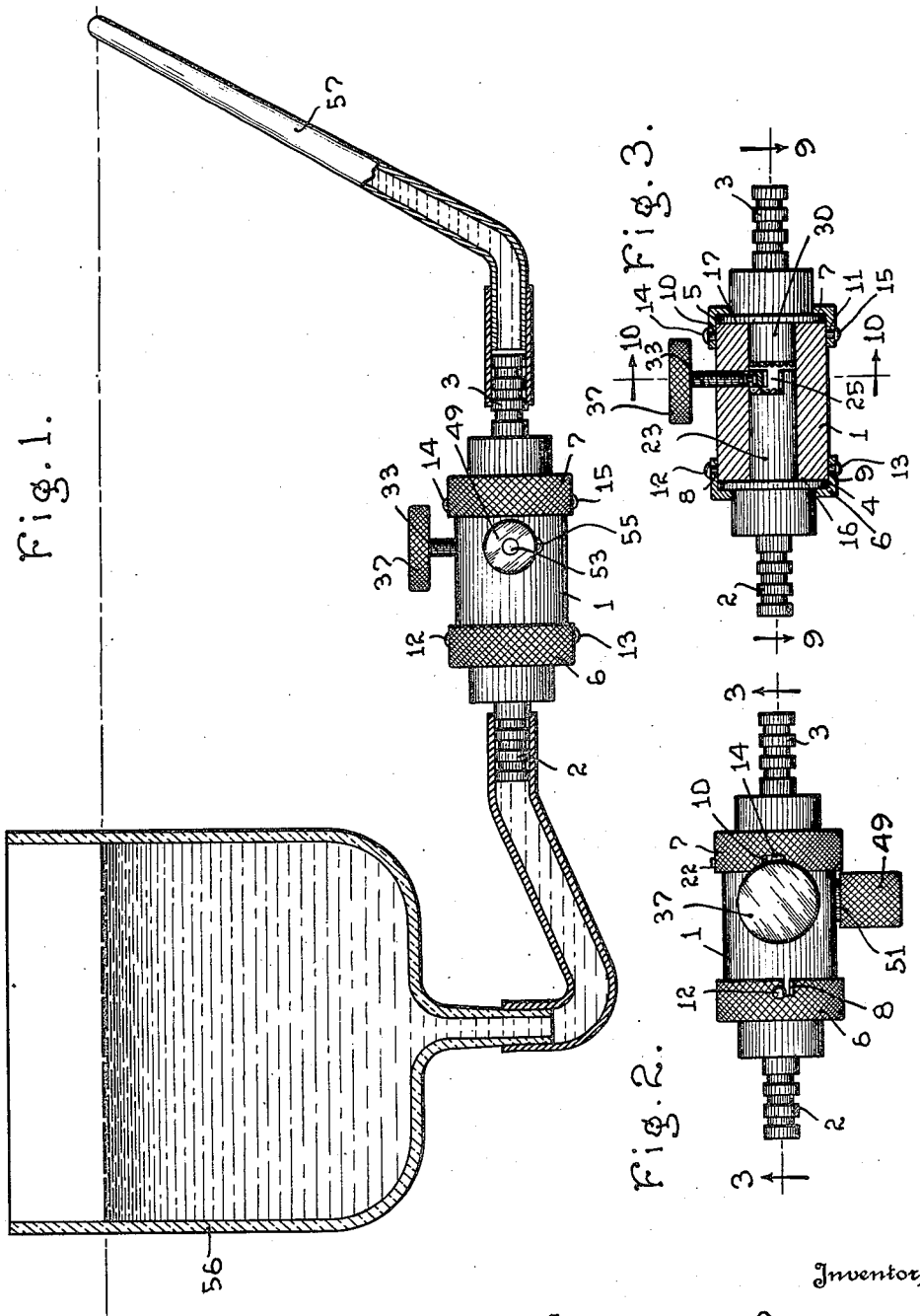

A. CERVI 1,614,825

APPARATUS FOR ABSORBING RADIUM EMANATION

Filed March 23, 1926   2 Sheets-Sheet 2

Inventor,
ARMANDO CERVI.
By
Attorney

Patented Jan. 18, 1927.

1,614,825

UNITED STATES PATENT OFFICE.

ARMANDO CERVI, OF NEW YORK, N. Y., ASSIGNOR TO THE RADIUM EMANATION CORPORATION, OF NEW YORK, N. Y., A CORPORATION OF DELAWARE.

APPARATUS FOR ABSORBING RADIUM EMANATION.

Application filed March 23, 1926. Serial No. 98,776.

My invention relates to a device for absorbing radium emanation present in a fragile seed in an absorption medium in the substantial absence of diluting fluids. Specifically, my invention provides a device whereby fragile seeds containing radium emanation may be crushed and the liberated radium emanation absorbed in an absorption medium substantially in the absence of undesirable diluting fluids.

The fragile seeds referred to contain radium emanation in equilibrium with the products of decomposition of radium emanation. The radium emanation itself is a decay product of radium; it is a gas and it collects above a solution of radium for example, radium bromide. When using a radium bromide solution, the impure emanation may be purified by substantially completely removing the impurities which in the major portion comprise, hydrogen chloride, hydrogen bromide, water vapor, hydrogen, and hydrogen peroxid. Any suitable purification mediums may be employed but I prefer to treat the impure emanation as follows: The gas is passed through potassium hydroxid, then through a heated cupric and cuprous oxid coil and finally through phosphorous pentoxid.

In order that my invention may be clearly understood reference is made to the accompanying drawing wherein, Figure 1 is a side view of the absorption crushing device in combination with a liquid container and an administering conduit;

Figure 2 is a plan view of the absorption and crushing device;

Figure 3 is a combined side view and sectional view, the section being taken on line 3—3 of Figure 2;

Figure 4:
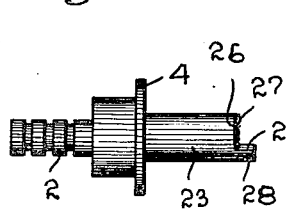
Figure 4 is a side view of the inlet member carrying a stationary jaw and a porous diaphragm.
Figure 6:
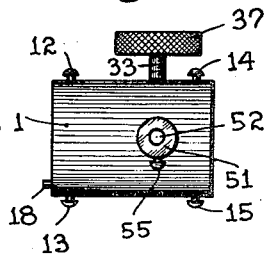
Figure 6 is a side view of the body member with the feeding cap removed.
Figure 7:
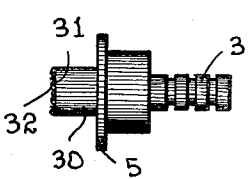
Figure 7 is a side view of the outlet member carrying a porous diaphragm.
Figure 5:
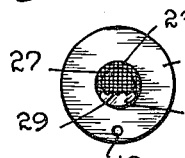
Figure 5 is an end view showing the porous diaphragm and stationary jaw.
Figure 8:
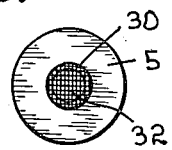
Figure 8 is an end view of the inlet member showing the porous diaphragm.
Figure 9:
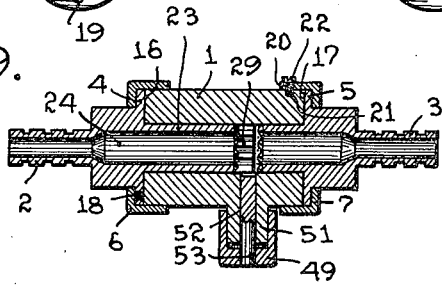
Figure 9 is a horizontal sectional view taken on line 9—9 of Figure 3.

Broadly, my invention comprises in a device for absorbing radium emanation present in a fragile seed in an absorption medium in the substantial absence of diluting fluids, the combination of a body member, crushing means associated therewith for crushing the fragile seed, means for feeding an absorption medium through the body member and crushing means, and means for feeding a fragile seed containing radium emanation into said body member and crushing means. Means are provided for holding the body member and the inlet and outlet members in substantially fluid tight connection to prevent the ingress of diluting fluids. The body member is provided with a feeding tube which carries a removable closure, the feeding tube having associated therewith means for sealing the tube against the formation of water pockets.

My invention will be described in connection with the specific embodiment set forth in the figures of drawing referred to but it is, of course, understood that the latter is merely the preferred embodiment, and that changes may be made within the spirit of my invention.

The invention accordingly consists in the features of construction, combination of elements and arrangement of parts which will be exemplified in the construction hereinafter set forth and the scope of the application of which will be indicated in the following claims.

The invention is illustrated, in its preferred embodiment in the accompanying drawing wherein:—

The absorption and crushing device comprises a body tube 1, an inlet member or tube 2 and an activated liquid outlet member 3. As shown in Figure 1 the absorption and crushing device is operatively connected to a liquid container 56 and an administering conduit 57. The inlet member 2 and outlet member 3 are provided with shoulders 4 and 5 abutting against the ends 16 and 17 of the body tube 1 and there held tightly by caps 6 and 7 provided with bayonet slots 8, 9, 10 and 11 forming bayonet joints with pins 12, 13, 14 and 15. Protruding from the end 16 of the body member 1, is a pin 18 registering with a receiving aperture 19 in the abutting flange 4 whereby the inlet member 2 is prevented from turning relative to the body member 1. The cap 7 is provided with an aperture 20 which registers with the interiorly threaded bore 21, the aperture 20 and bore 21 receiving the screw 22 whereby the outlet member 2 is prevented from turning relative to the body member 1. The structure set forth provides means for holding the inlet member 2, the body member 1 and the outlet member 3 together and insures a substantially fluid tight connection between these members.

The inlet member 2 is provided with a tubular extension 23 having a passage way 24 leading to the crushing chamber 25. Permanently attached to the end 26 of the tubular extension 23 is a porous diaphragm of fine texture such as a screen 27 which covers only a portion of the end 26 integral with a lower stationary jaw 28 provided with teeth 29. The screen 27 may be secured to the end 26 by solder or equivalent means. It is preferred that the screen be of approximately 300 or 400 mesh. The outlet member 3 has a tubular extension 30, the end 31 of which is covered by a very fine mesh screen 32, or other suitable diaphragm. The function of the diaphragm is to allow the absorption medium to pass through the inlet member 2 into the crushing compartment and then through the outlet member. Simultaneously the diaphragm functions to prevent foreign material such as finely crushed glass from passing therethrough. The most satisfactory results have been obtained with a fine mesh screen but it is obvious that my invention is not limited to the use of such a screen but broadly contemplates the use of any diaphragm which will function as indicated. Instead of employing a fine mesh diaphragm made of metal, porous rubber may be used. The use of the term "porous diaphragm of fine texture" is intended to cover the use of a fine mesh metallic diaphragm or a diaphragm made of naturally occurring or synthetic materials.

Figure 10:
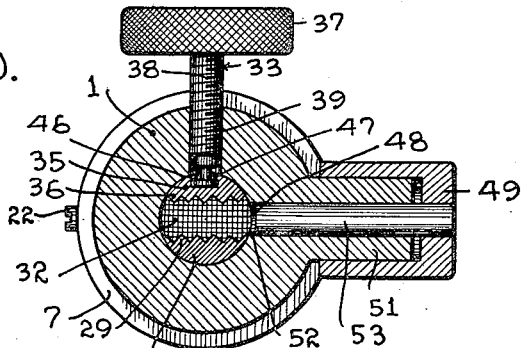
Figure 10 is a vertical cross sectional view taken on line 10—10 of Figure 3.
Figure 11:
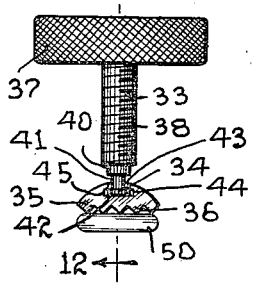
Figure 11 is a detail of the jaw actuating member and the movable jaw attached thereto.
Figure 12:
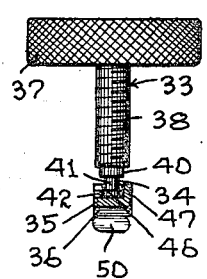
Figure 12 is a cross sectional view thereof taken on line 12—12 of Figure 11.
Figures 13, 14:
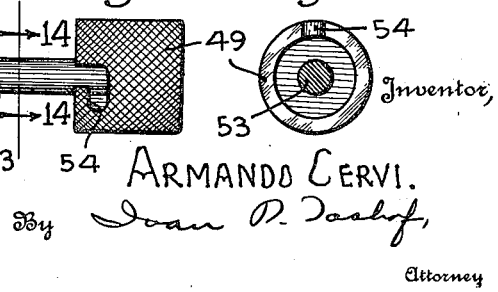
Figure 13 is a detail of the feeding cap carrying a closing rod adapted to seal the feeding tube against the formation of water pockets.
Figure 14 is a combined side elevation of the feeding cap and cross sectional view of the closing rod taken on line 14—14 of Figure 13 in the direction of the arrows.

The crushing screw 33 carries at its end a jaw support 34 on which there is removably and loosely mounted the movable jaw 35 provided with teeth 36 which are staggered relatively to the teeth 29 of the stationary jaw 28, as shown in Figure 10. The crushing screw 33 is provided with a head piece 37 and is exteriorly threaded as at 38. The body member 1 has a bore 39 also functioning as a bearing which is interiorly threaded to allow the crushing screw 33 to work therein. At the end of the screw 33 there is a shoulder 40, a groove 41 and a flange 42. Referring to Figs. 11 and 12, the movable jaw 35 has a slot 43 cut therein, the side walls of the slot being designated by the numerals 44 and 45. The slot is of sufficient depth to loosely receive the flange 42. The depth is greater than that of flange so as to allow room for play. The jaw 35 is provided with arcuate nibs 46 and 47, as shown in Fig. 10 which rest in the groove 41, adjacent to the flange 42 and around the flange as indicated in Figs. 11 and 12 thereby providing a loose but secure attachment for the jaw 35 to the screw 33. It is obvious that the screw 33 may be replaced by any of its mechanical equivalents so long as they function to feed the movable jaw 35 in a regulated manner.

The compartment formed by the screens 27 and 32 and the movable and stationary jaws 35 and 28 may be termed the crushing compartment 25. Into this crushing compartment a fragile seed 50 such as shown in Figs. 11 and 12 may be charged by removing the cap 49. Integral with the body member 1, is a feeding tube 51 which has a passage way 52 extending to the crushing compartment 25 as indicated at 48 of Fig. 10. The cap 49 carries a rod 53 which substantially fills the passage way 52 when the cap 49 is placed in the feeding tube 51, thereby preventing water when the crusher is in use from entering passage way 52, as when this occurs radium emanation is occluded in the water and this is not desirable. The rod 53 provides means for sealing the feeding tube against the formation of water pockets. The cap 49 is provided with a bayonet slot 54 which forms with pin 55 carried by feeding tube 51 a bayonet joint.

Before feeding the seed 50 into the feeding tube 51, the screw 33 is turned to move the movable jaw 35 in a receded position from stationary jaw 28, as shown in Fig. 10 so as to allow for the entry of the fragile seed 50 containing radium emanation. The seed 50 is then inserted through the passage way 52 into the crushing compartment 25. Thereafter, the cap 49, carrying the rod 53 is placed on the feeding tube 51, the rod 53 substantially completely filling the passage way 52. The cap 49 is held tightly to the feeding tube 51 by means of the bayonet joint. The fragile seed as it enters the crushing compartment is positioned between stationary jaw 28 and the movable jaw 35, the latter being activated by the screw 33. Upon the preliminary turning of the screw 33 the movable jaw 35 is brought closer to the stationary jaw 28 and upon further manipulation of the screw 33, the teeth 29 and 36 bite into the fragile glass seed and crush the same liberating the fluid radium emanation present therein, the latter being absorbed by water which is flowing through the crushing compartment 25, the water entering from a suitable source such as liquid container 56 by means of the inlet member 3.

It will be noted that according to my invention, I provide means for crushing capillary tubes containing radium emanation under water and thereby the emanation is brought into intimate contact with the water. In this connection, it may be stated that crushing is absolutely necessary and that mere breaking will not suffice. The structure I have set forth operates to finely crush a fragile seed such as a glass seed containing radium emanation and liberates the emanation without the formation of radium emanation pockets. The crushing operation is carried out under water and in a small compartment of approximate volume of one-quarter c. c. Using my device, I have found it satisfactory to allow a volume of water between 100 and 200 c./c. per minute to flow in one direction from the liquid container 56 through the inlet 3 and the crushing compartment 25 thereby allowing the finely crushed pieces of glass to be efficiently washed. Fresh water is constantly presented to these pieces of glass and in this manner, the radium emanation is thoroughly absorbed. It will be noted that I have provided fine diaphragms such as screens 27 and 32 which function to prevent any pieces of crushed glass from passing through the tubular extension 30 and the outlet member 3. The shape of the crushing compartment 25 also tends to prevent the formation pockets where the radium emanation may be occluded.

Applicant's new product comprising an activated fluid carrying radium emanation in which diluting fluids are substantially absent, the process of preparing the activated fluid consisting of bringing the radium emanation into solution and then administering the same, both the solution step and the administering step occurring in the absence of a diluting fluid, and the apparatus for preparing the activated fluid containing radium emanation comprising broadly, the combination of a receptacle having therein a fluid and means for crushing a fragile seed containing radium emanation, are described and claimed in applicant's copending application Serial No. 95,119, filed March 16, 1926.

I claim:

1. In a device for absorbing radium emanation present in a fragile seed in an absorption medium in the substantial absence of diluting fluids, the combination of a body member, crushing means associated therewith for crushing said fragile seed, means for feeding an absorption medium through said body member and crushing means, and means for feeding a fragile seed containing radium emanation into said body member and crushing means.

2. In a device for absorbing radium emanation present in a fragile seed in an absorption medium in the substantial absence of diluting fluids, the combination of a body member, an inlet member having one end thereof provided with a stationary crushing jaw and a porous diaphragm of fine texture to allow the passage of an absorption medium, an outlet member having one end covered with a porous diaphragm of fine texture, a movable jaw associated with said stationary jaw, said movable jaw and stationary jaw providing crushing means, and means for feeding a fragile seed containing radium emanation into said body and crushing means.

3. In a device for absorbing radium emanation present in a fragile seed in an absorption medium in the substantial absence of diluting fluids, the combination of a body member, an inlet member having one end thereof provided with a stationary crushing jaw and a porous diaphragm of fine texture to allow the passage of an absorption medium, an outlet member having one end covered with a porous diaphragm of fine texture, a movable jaw associated with said stationary jaw, said movable jaw and stationary jaw providing crushing means, means for feeding a fragile seed containing radium emanation into said body and crushing means, and means for holding said body member and inlet and outlet members in substantially fluid tight connection to prevent the ingress of diluting fluids.

4. In a device for absorbing radium emanation present in a fragile seed in an absorption medium in the substantial absence of diluting fluids, the combination of a body member, an inlet member having one end thereof provided with a stationary crushing jaw and a fine mesh screen to allow the passage of an absorption medium, an outlet member having one end covered with a fine mesh screen, a movable jaw associated with said stationary jaw, said movable jaw and stationary jaw providing crushing means, and means for feeding a fragile seed containing radium emanation into said body member and crushing means.

5. In a device for absorbing radium emanation present in a fragile seed in an absorption medium in the substantial absence of diluting fluids, the combination of a body member, an inlet member, an outlet member, crushing means associated therewith for crushing said fragile seed, means for feeding a fragile seed containing radium emanation into said body member and crushing means, and means for holding said body member and inlet and outlet members in substantially fluid tight connection to prevent the ingress of diluting fluids.

6. In a device for absorbing radium emanation present in a fragile seed in an absorption medium in the substantial absence of diluting fluids, the combination of a body member, an inlet member, an outlet member, crushing means associated therewith for crushing said fragile seeds, means for feeding a fragile seed containing radium emanation into said body member and said crushing means, means for sealing said feeding means against the formation of water pockets, and means for holding said body member, inlet and outlet members in substantially fluid tight connection.

7. In a device for absorbing radium emanation present in a fragile seed in an absorption medium in the substantial absence of diluting fluids, the combination of an apertured body member provided with a bore, a jaw actuating member working in said bore and leading to the body member aperture, a movable jaw attached to said jaw actuating member and a fixed jaw cooperating with said movable jaw to provide crushing means for crushing a fragile seed.

8. In a device for absorbing radium emanation present in a fragile seed in an absorption medium in the substantial absence of diluting fluids, the combination of an apertured body member provided with a bore, a jaw actuating member working in said bore and leading to the body member aperture, a movable jaw loosely and removably attached to said jaw actuating member and a fixed jaw cooperating with said movable jaw to provide crushing means for crushing a fragile seed.

9. In a device for absorbing radium emanation present in a fragile seed in an absorption medium in the substantial absence of diluting fluids, the combination of an apertured body member provided with a bore, a jaw actuating member working in said bore and leading to the body member aperture, said actuating member being provided at its inner end with a flange and an adjacent groove, a slotted jaw loosely receiving said flange and provided with nibs resting in said jaw and a fixed jaw cooperating with said jaw to provide means for crushing a fragile seed.

10. In a device for absorbing radium emanation present in a fragile seed in an absorption medium in the substantial absence of diluting fluids, the combination of an apertured body member, a feeding tube having a passage way leading to said body member aperture and a removable closure for said feeding tube provided with means for sealing said tube against the formation of water pockets.

11. In a device for absorbing radium emanation present in a fragile seed in an absorption medium in the substantial absence of diluting fluids, the combination of an apertured body member, a feeding tube having a passage way leading to said body member aperture and a removable closure for said feeding tube provided with means when in its closed position for preventing the entrance of a fluid in the feeding tube passage way and the resultant occlusion of a solution of radium emanation.

12. In a device for absorbing radium emanation present in a fragile seed in an absorption medium in the substantial absence of diluting fluids, the combination of an apertured body member, a feeding tube having a passage way leading to said body member aperture and a removable closure for said feeding tube comprising a rod substantially filling and sealing said feeding tube passage.

13. As an element in a device for absorbing in an absorption medium radium emanation present in a fragile seed, a tubular member provided at one end thereof with a porous diaphragm of fine texture and a fixed crushing jaw.

14. As an element in a device for absorbing in an absorption medium radium emanation present in a fragile seed, a tubular member provided at one end thereof with a fine mesh screen and a fixed crushing jaw.

15. In a device for absorbing radium emanation present in a fragile seed in an absorption medium in the substantial absence of diluting fluids, the combination of a body member, an inlet member having one end thereof provided with a stationary crushing jaw and a porous diaphragm of fine texture to allow the passage of an absorption medium, an outlet member having one end covered with a porous diaphragm of fine texture, a movable jaw associated with said stationary jaw, said movable jaw and stationary jaw providing crushing means, feeding means for feeding a fragile seed containing radium emanation into said body and crushing means and means for sealing said feeding means against the formation of water pockets.

16. In a device for absorbing radium emanation present in a fragile seed in an absorption medium in the substantial absence of diluting fluids, the combination of a body member, an inlet member having one end thereof provided with a stationary crushing jaw and a porous diaphragm of fine texture to allow the passage of an absorption medium, an outlet member having one end covered with a porous diaphragm of fine texture, a movable jaw associated with said stationary jaw, said movable jaw and stationary jaw providing crushing means, feeding means for feeding a fragile seed containing radium emanation into said body member and crushing means, means for sealing said feeding means against the formation of water pockets, and means for holding said body member and inlet and outlet members in substantially fluid tight connection to prevent the ingress of diluting fluids.

17. In a device for absorbing radium emanation present in a fragile seed in an absorption medium in the substantial absence of diluting fluids, the combination of a body member, an inlet member having one end thereof provided with a stationary crushing jaw and a fine mesh screen to allow the passage of an absorption medium, an outlet member having one end covered with a fine mesh screen, a movable jaw associated with said stationary jaw, said movable jaw and stationary jaw providing crushing means, feeding means for feeding a fragile seed containing radium emanation into said body member and crushing means and means for sealing said feeding means against the formation of water pockets.

18. In a device for absorbing radium emanation present in a fragile seed in an absorption medium in the substantial absence of diluting fluids, the combination of a body member, an inlet member having one end thereof provided with a stationary crushing jaw and a fine mesh screen to allow the passage of an absorption medium, an outlet member having one end covered with a fine mesh screen, a movable jaw associated with said stationary jaw providing crushing means, feeding means for feeding a fragile seed containing radium emanation into said body member and crushing means, means for sealing said feeding means against the formation of water pockets and means for holding said body member and inlet and outlet members in substantially fluid tight connection to prevent the ingress of diluting fluids.

In testimony whereof he hereunto affixes his signature.

ARMANDO CERVI.